(12) United States Patent
Deshpande

(10) Patent No.: US 7,831,630 B2
(45) Date of Patent: Nov. 9, 2010

(54) AUTOMATION TOOL FOR PROVIDING ACCESS TO AN ELECTRONIC DATABASE FOR BUSINESS INTELLIGENCE

(75) Inventor: Smita Deshpande, Maharashtra (IN)

(73) Assignee: Accenture Global Services Limited, Dublin (IE)

( * ) Notice: Subject to any disclaimer, the term of this patent is extended or adjusted under 35 U.S.C. 154(b) by 329 days.

(21) Appl. No.: 11/779,514

(22) Filed: Jul. 18, 2007

(65) Prior Publication Data
US 2009/0024659 A1    Jan. 22, 2009

(51) Int. Cl.
G06F 17/30 (2006.01)
G06F 7/00 (2006.01)

(52) U.S. Cl. .................................................. 707/802

(58) Field of Classification Search ............... 707/104.1, 707/101, 102, 802
See application file for complete search history.

(56) References Cited

U.S. PATENT DOCUMENTS

2002/0004853 A1* 1/2002 Jones et al. ................. 709/328
2004/0073866 A1* 4/2004 Kunzel ....................... 715/500
2005/0262189 A1* 11/2005 Mamou et al. .............. 709/203

OTHER PUBLICATIONS

"Introduction to Business Objects 5i", Training Development, Business Objects, Apr. 12, 2004.

* cited by examiner

Primary Examiner—Kuen S Lu
(74) Attorney, Agent, or Firm—Mannava & Kang, P.C.

(57) ABSTRACT

A method for providing access to an electronic database for business intelligence is provided. The method includes receiving a request to create a new universe to interface with the electronic database to access the electronic database for business intelligence, receiving an input of a first set of universe details to populate the new universe, executing at least a first application macro to populate the new universe with the received first set of universe details by calling a business intelligence application to create the new universe with the populated first set of universe details; and providing the created new universe as a metadata layer that interfaces with the electronic database to provide access to the electronic database.

20 Claims, 8 Drawing Sheets

AUTOMATION TOOL FOR PROVIDING ACCESS TO AN ELECTRONIC DATABASE FOR BUSINESS INTELLIGENCE

BACKGROUND

There exist a number of software tools or suites that support queries and accesses to data warehouses, such as electronic databases residing in servers and the like, to provide business intelligence to businesses. As referred herein, business intelligence includes applications and technologies that work together to collect, provide access to, and analyze data and information about operations of a business or any other desired entity. Thus, a company can implement a business intelligence software application in its operations to obtain a more comprehensive knowledge of the factors affecting their business, such as metrics (i.e., data measurements) on sales, production, human resources, and other internal operations to enable the company to make better business decisions. Examples of commercially-available business intelligent software applications include but are not limited to: BusinessObjects™ of Business Objects, S.A., Paris, France; MicroStrategy 8™ of MicroStrategy Inc., McLean, Va.; and Hyperion Intelligence™ of Hyperion Solutions Corp., Santa Clara, Calif.

A business intelligence software or application (hereinafter, "BI application") typically includes multiple components for providing report creation, data viewing, and data distribution in one or more databases of interest. To that effect, a BI application creates a metadata layer, also known as a universe, to interface with a database in order to map everyday business terms to the data stored in the database. The universe simplifies the processes of creating reports, viewing data and distributing data by providing an easy way to see and understand the data.

Conventionally, to create a universe for interfacing with a database, a template is initially created to prepare and capture the low-level design specifications of the universe based on the data in the database of interest. Once the low-level design specifications are prepared and captured, the BI application may be used to develop or create a universe based on the low-level design specifications. However, the conventional approach to developing a universe takes a significant amount of time and requires knowledgeable information technology (IT) professionals because components of the universe (classes, objects, etc.) must be manually defined in a universe window, as provided by the BI application, with reference to the prepared low-level design specifications. Thus, once the universe design specifications are written, most of the universe creation activities are manually intensive and time consuming. Accordingly, the conventional approach is costly and causes a company to delay implementation of business intelligence to better manage its operations in the fast-paced world.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Described herein are methods and systems that provide an automation tool for using a BI application to create, develop, or document a metadata layer or universe for accessing data in a database of interest. Once deployed, this automation tool provides substantial time and cost savings over the conventional systems and methods for universe development.

System

Figure 1A:
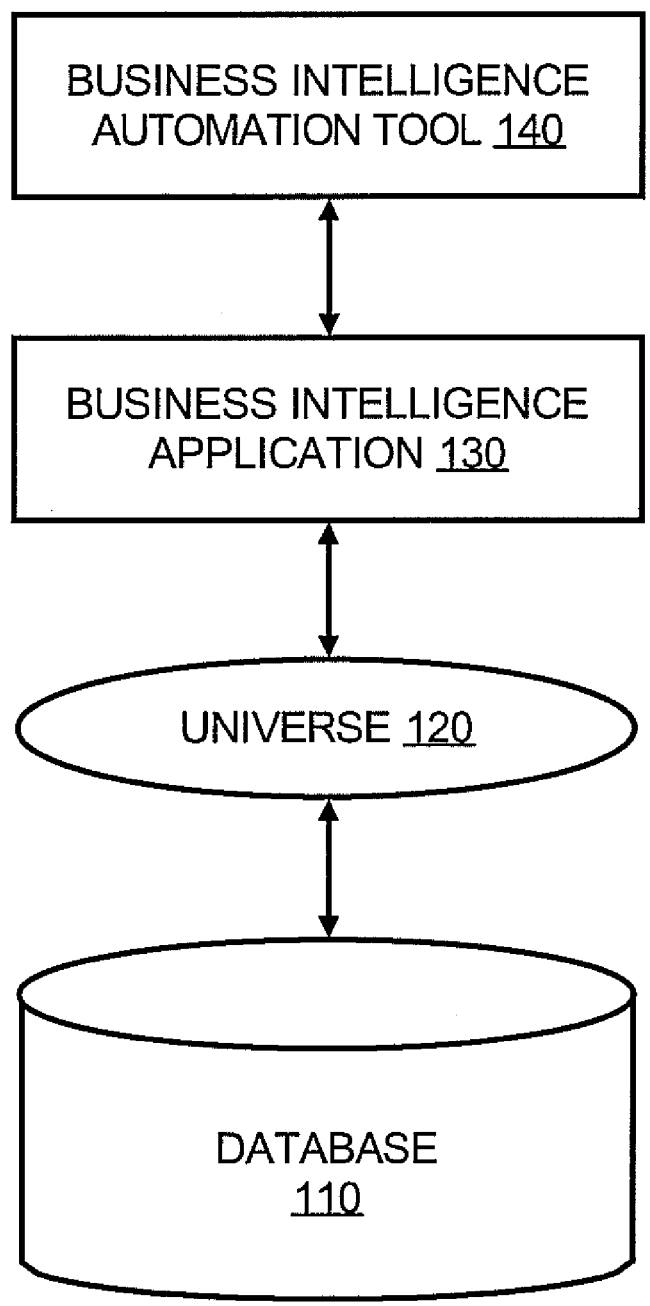
FIG. 1A illustrates a system for developing a universe with a business intelligence (BI) tool to access a database of interest through use of a BI automation tool, in accordance with one embodiment

FIG. 1A illustrates a system 100 for employing a BI automation tool 140 to interact with a BI application 130 in order to provide access to a database 110 of interest via a universe 120, in accordance with one embodiment. For example, the database 110 stores data about the operations of a business to which business intelligence is to be applied to obtain a more comprehensive knowledge of the factors affecting the business based on the stored data. The BI automation tool 140 is a software application that includes one or more computer-executable application macros (hereinafter, "macros") to automatically obtain the desired low-level design specifications for the database universe 120 that are the universe details, document such specifications in a template, and develop the database universe 120 with such a template. For example, if the database 110 stores data relating to the operations of a beach resort, the desired low-level design specifications of a universe for such a database include classes such as resorts, sales, customer, and reservations, objects that provide fields in database tables such as name and city fields for customers' addresses, database table names such as city, country, customer, region, and sales database tables, joins between database tables, conditions that are selection criteria for queries to the database 110, and context names for defining paths (collection of joins) for database queries to execute.

The BI automation tool 140 is also operable to automatically document an existing universe in a data file, such as an electronic spreadsheet (hereinafter, "spreadsheet") file, so as to simplify future maintenance of the universe via access to the universe-documented file. Examples of spreadsheet programs or applications that may be used by the BI automation tool 140 include but are not limited to Microsoft Excel™ and Lotus Improv™.

The BI application typically provides or exposes a set of application programming interfaces (APIs) through an available software development kit (SDK), whereby the BI automation tool 140 is operable to take advantage of the SDK and APIs therein to interact with the BI application 130 and access stored data in a universe that has been created with such a BI application 130. Accordingly, in one embodiment, a single BI automation tool may be programmed or coded, using the provided SDK, to access the APIs of any desired number of commercially-available BI applications to access universes created by such BI applications. In another embodiment, a separate BI automation tool may be programmed or coded to access the APIs of each particular BI software application. In this alternative embodiment, an operator may employ a different BI automation tool to access a universe created by a corresponding BI software application.

As referred herein, a database such as the database 110 is a structured collection of records or data that is stored in a electronic storage space, such as a computer readable medium (CRM), so that such data may be queried, retrieved or accessed. Examples of a CRM include a hard disk drive, a removable storage drive representing a floppy diskette drive, a magnetic drive, a compact disk drive, a flash drive (e.g., USB drive), and the like. Other examples of a CRM include ROM (read only memory), EPROM (erasable, programmable ROM), EEPROM (electrically erasable, programmable ROM), or any other electronic, optical, magnetic, or other storage or transmission device capable of storing electronic data and providing a processor or processing unit with computer-readable or electronic-type instructions.

As also referred herein, a universe such as the universe 120 is a metadata layer or database interface that is logically situated above the database 110 to provide an interface to the database. The universe 120 maps everyday common terms to the data in the database 110 through the creation of data classes and objects in the universe 120 for the data structures, such as data tables, in the database 110. Objects represent fields in a database table or other data structure, classes are logical groupings of objects, and the universe 120 is a collection of classes. Thus, the universe 120 simplifies the process of querying, accessing, and retrieving the structured collection of records or data in the database 110 by providing automatic joins between the database tables based on predetermined key values or parameters.

Figure 1B:
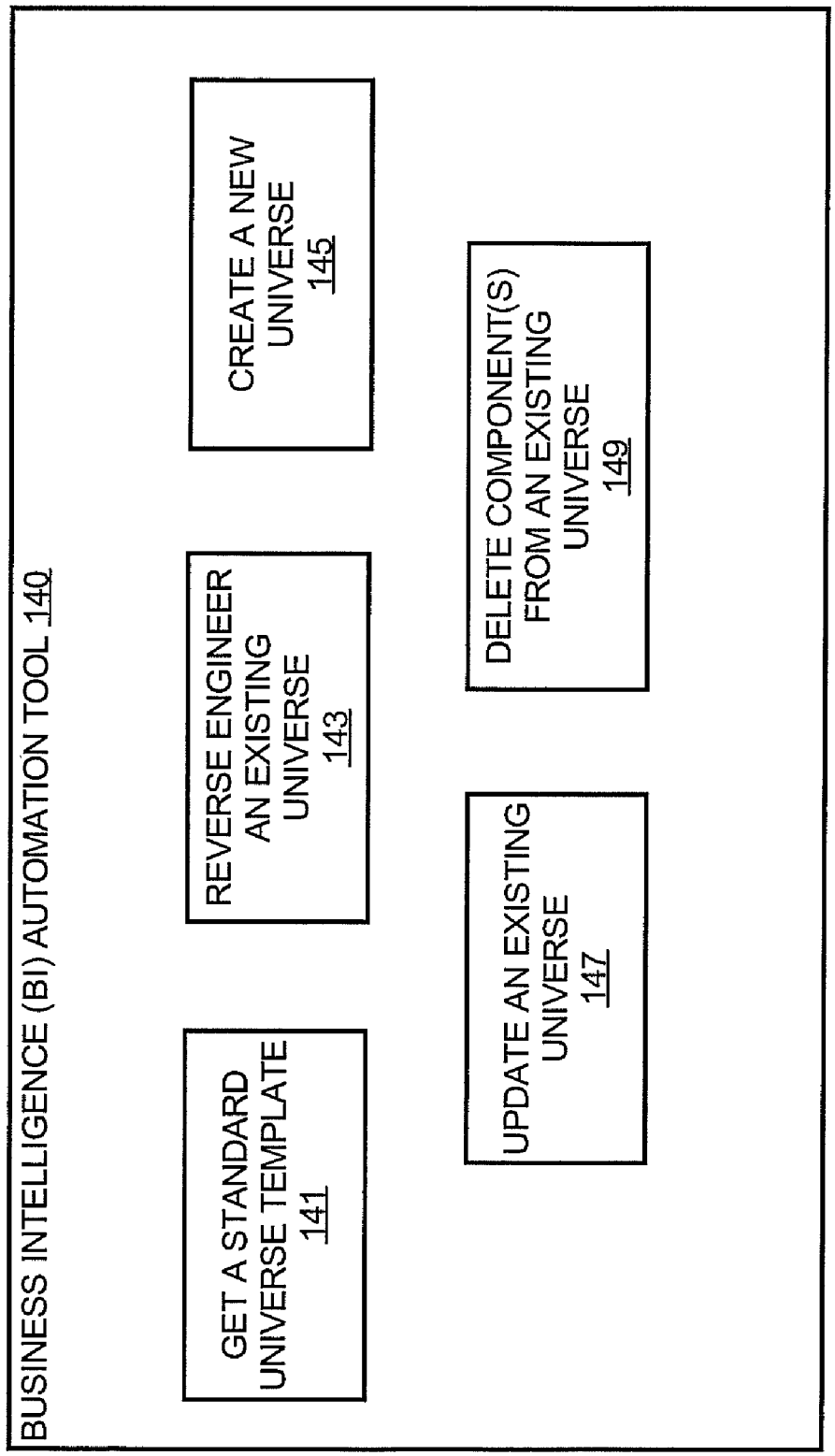
FIG. 1B illustrates a block diagram of the BI automation tool, in accordance with one embodiment.

FIG. 1B illustrates a block diagram of the BI automation tool 140 (FIG. 1A) that provides operators such as universe designers with a simpler, time-saving approach for creating a universe with a BI application to access a database of interest. Accordingly, in one embodiment, the BI automation tool 140 provides an operator with a user interface, such as a graphical user interface (GUI), wherein the operator is able to select options for one or more of the following functionalities: get or retrieve a standard template 141 for creating a universe, reverse engineering a universe 143, create a new universe 145, update an existing universe 147, and delete all components from an existing universe 149. For example, the GUI is similar to the block diagram 140 illustrated in FIG. 1B, wherein each functionality block is a button on which the operator can click or depress to select the respective functionality. In turn, the BI automation tool 140 includes one or more macros computer-coded to perform the aforementioned functionalities. Each of these tool functionalities is further described below with reference to the flowchart diagrams illustrated in FIGS. 3-7. For illustrative purposes only and not to be limiting thereof, the methods in FIGS. 3-7 are discussed in the context of the system 100 illustrated in FIGS. 1A-B.

Figure 2:
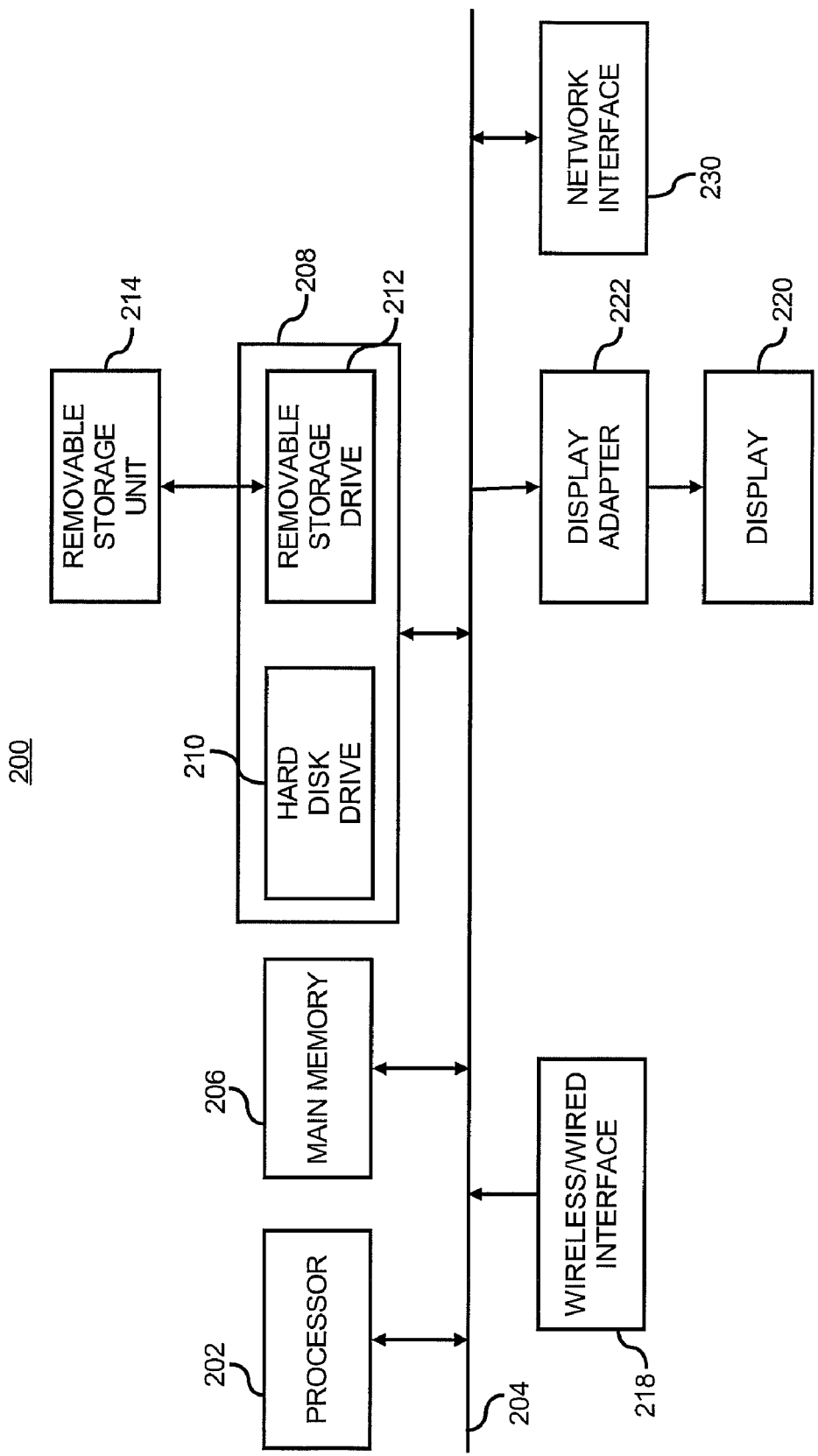
FIG. 2 illustrates a block diagram of a platform for implementing the BI automation tool or the entire system in FIG. 1A, in accordance with one embodiment.

FIG. 2 illustrates a block diagram of a computerized system 200 that is operable to be used as a platform for implementing the BI automation tool 140 and its functions as illustrated in FIG. 1B. Alternatively, the computerized system 200 is operable as a platform for implementing the entire system 100.

The computer system 200 includes one or more processors, such as processor 202, providing an execution platform for executing software. Thus, the computerized system 200 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 202 are communicated over a communication bus 204 or through point-to-point links with other components in the computer system 200.

The computer system 200 also includes a main memory 206 where software is resident during runtime, and a secondary memory 208. The secondary memory 208 may also be a CRM as described earlier that may be used to store software programs, applications, or modules for the BI automation tool, the BI application 130, the universe 120, the database 110, or any combination thereof. Thus, the CRM is operable to store software programs, applications, or modules that implement the methods 300-700 as described later. The main memory 206 and secondary memory 208 (and an optional removable storage unit 214) each includes, for example, a CRM. The computer system 200 includes a display 220 connected via a display adapter 222, user interfaces comprising one or more input devices 218, such as a keyboard, a mouse, a stylus, and the like. However, the input devices 218 and the display 220 are optional. A network interface 230 is provided for communicating with other computer systems via, for example, a network.

Process

Figure 3:
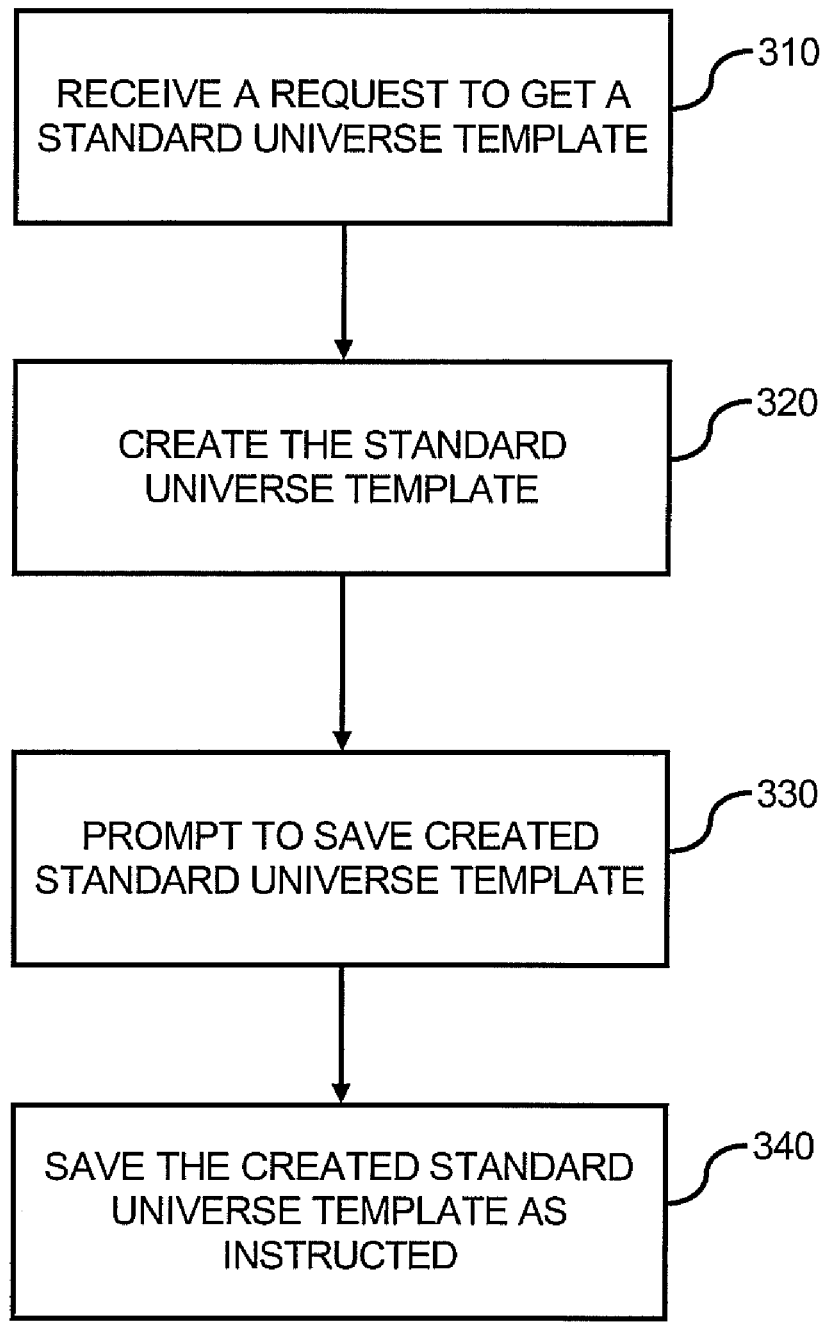
FIG. 3 illustrates a flowchart diagram of a method for the universe design specifications template retrieval functionality as performed by a BI automation tool, in accordance with one embodiment.

FIG. 3 illustrates a flowchart diagram of a method 300 for the universe design specifications template retrieval functionality (141, FIG. 1B) as performed by the BI automation tool 140, according to one embodiment.

At 310, when an operator clicks on the button 141 for a request to get or retrieve a standard design specifications template (or "universe template") for detailing a universe, the BI automation tool 140 receives the request for a standard universe template.

At 320, in response, the BI automation tool 140 proceeds to create or generate a standard blank universe template with predefined cell formats wherein universe details, or low-level design specifications, may be entered. Each universe template corresponds to the particular BI application 130 being used to create the universe. For example, if the BI application 130 is the BusinessObjects™ business intelligence application, then the BI automation tool 140 includes one or more spreadsheet macros that are executed to create or generate a blank standard universe template that is specific for use with the BusinessObjects™ business intelligence application. Thus, the BI automation tool 140 may further prompt the operator to select a desired template from a list of available standard universe templates in the case where BI automation tool 140 is operable with different BI applications. In one example, the standard universe template is a spreadsheet workbook with predefined cell formats where details of a universe may be stored, such as multiple worksheets of classes, objects, tables, joins, conditions, contexts, and hierarchies.

The "classes" worksheet stores class names for the universe 120 that are created to group objects found in the database 110. The "objects" worksheet is used to store data elements or fields and their associated data tables. These objects are to be used to construct queries on the database 110 and to return with the corresponding queried values. The "tables" worksheet includes a listing of all data tables found in the database 110. The "joins" worksheet includes joins between the database tables based on key values or parameters. The "conditions" worksheet stores conditions that may be defined by a universe designer to help the business or reporting user to easily create reports on data stored in the database 110. The "contexts" worksheet stores defined paths for database queries to execute, whereby each path is defined as a collection of joins. For example, when database tables A, B, C are all connected or joined to each other, and a report query is created with tables A and C, two paths or contexts may be defined in the "contexts" worksheet to get to table A and C, namely A->B->C and A->C. The "hierarchies" worksheet stores the hierarchies to be defined in the universe. For example, a time hierarchy is Year->Quarter->Month->Week->Day. These hierarchies are defined in the universe for better reporting. For example, when a time hierarchy is defined, a user is able to see a report with sales revenue or other items of interest for each year, and the user may further see the sales revenues broken up by Quarters, Month, Week, and Day.

At 330, once a standard universe template is retrieved or created in response to the operator's request, the BI automation tool 140 prompts the operator to save the retrieved template.

At 340, the BI automation tool 140 receives a request or instruction from the operator to save the retrieved template, whereby the BI automation tool 140 saves the retrieved template in an electronic storage location or space, such as a CRM. This template may be subsequently used by the operator or others to create a file compiled of universe details that include low-level design specifications, arranged in the predefined cell format, for use to create a universe (145, FIG. 1B) or modify a universe (147, FIG. 1B) by the BI automation tool 140 as further described later.

Figure 4:
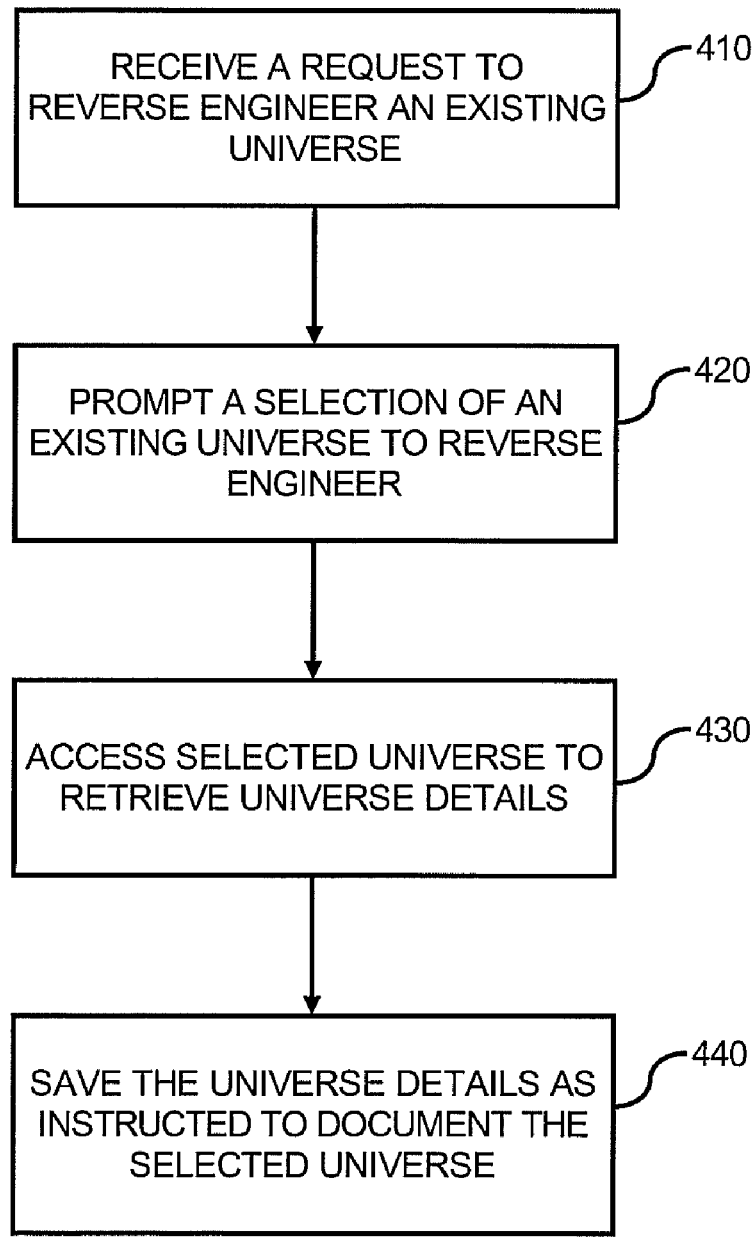
FIG. 4 illustrates a flowchart diagram of a method for the universe reverse-engineering functionality as performed by a BI automation tool, in accordance with one embodiment.

FIG. 4 illustrates a flowchart diagram of a method 400 for the universe reverse-engineering functionality (143, FIG. 1B) as performed by the BI automation tool 140. There are a number of instances where it may be desired to reverse engineer an existing universe. For example, if there exists a stable universe for a database, and the universe was subsequently modified and became unstable. The cause(s) of the instability may be diagnosed by reverse engineering both the stable original universe and the modified unstable universe and comparing the two resulting files, e.g., spreadsheet files, of the universe details to determine the cause(s). That is because reviewing two files of universe details is simpler than reviewing the two actual universes.

Referring to FIG. 4, at 410, when an operator clicks on the button 143 for a request to reverse engineer an existing universe, the BI automation tool 140 receives the request.

At 420, in response, the BI automation tool 140 prompts the operator to select or identify a universe, such as the universe 120, from a list of available universes that are of record to and accessible by the BI automation tool 140. The available universes may have been previously created by the operator or others via one or more selected BI applications in a manner known in the art, and the BI automation tool 140 is operable to call on the selected BI application(s) through a set of APIs provided by the SDK of the BI application. For example, the BI application 130 is the BusinessObjects™ business intelligence application, and the BI automation tool 140 is operable to call on the BusinessObjects™ application through the APIs provided by the SDK of such a BusinessObjects™ application.

At 430, once the operator selects a universe, such as the universe 120, to reverse engineer, the BI automation tool 140 proceeds to access the selected universe 120, through the aforementioned APIs provided by the BI software application that was used to create the selected universe, to retrieve universe details from the selected universe 120. For example, the BI automation tool 140 includes one or more spreadsheet macros that are executed to use the APIs provided by BusinessObjects™ application to capture the complete details of all the classes, objects, joins, tables, conditions, contexts, and hierarchies used in the selected universe 120, which was created by the BusinessObjects™ application. The spreadsheet macro also writes the captured universe details into respective worksheets to populate a new spreadsheet workbook which may be based on a universe template such as the standard template noted earlier. The BI automation tool 140 also prompts the operator to document the selected universe 120 by saving the populated new spreadsheet workbook.

At 440, the BI automation tool 140 receives a request or instruction from the operator to document the selected universe 120 whereby, for example, the BI automation tool 140 saves the new spreadsheet workbook as a spreadsheet file in an electronic storage location or space, such as a CRM. Once the universe 120 is documented in a file, such as a spreadsheet file, future maintenance (correcting, updating, amending, creating another universe, etc.) of the universe is simplified via access to the documented file, as further described later with reference to the universe creating and updating functionalities 145, 147 (FIG. 1B).

Figure 5:
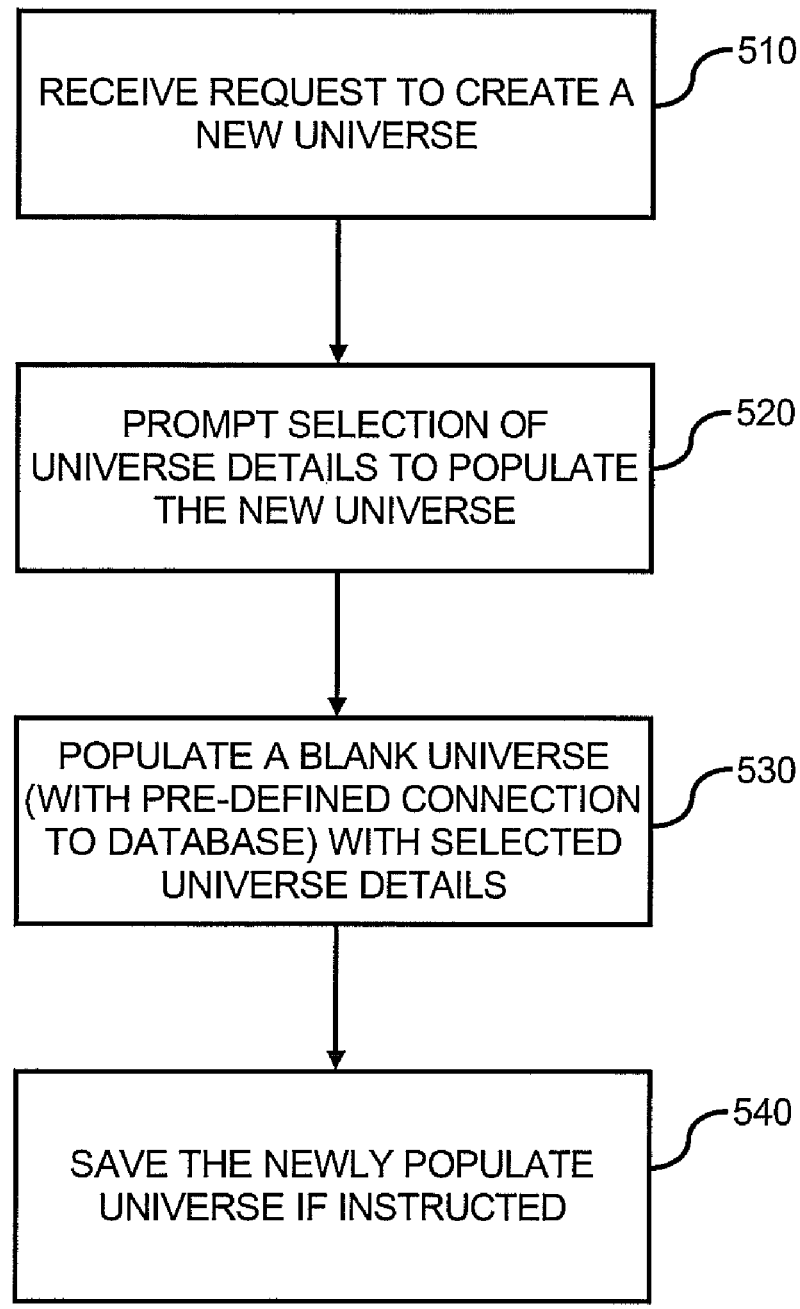
FIG. 5 illustrates a flowchart diagram of a method for the universe creation functionality as performed by a BI automation tool, in accordance with one embodiment.

FIG. 5 illustrates a flowchart diagram of a method 500 for the universe creation functionality (145, FIG. 1B) as performed by the BI automation tool 140.

At 510, when an operator clicks on the button 145 for a request to create a new universe, the BI automation tool 140 receives the request.

At 520, in response, the BI automation tool 140 prompts the operator to select the desired universe details, or low-level design specifications, to populate the new universe. The universe details may be stored in a file, such as a spreadsheet file. For example, the BI automation tool 140 prompts the operator to select a spreadsheet file that contains the desired universe details for creating the new universe. The file may be one that was previously documented through reverse engineering an existing universe, as described above with reference to FIG. 4. Alternatively, the file may be one that was previously created to include all the desired universe details by the operator or others, whereby the file was created with a template generated as described with reference to FIG. 3 above.

At 530, once the BI automation tool 140 receives the selected universe details, it proceeds to populate a blank universe (with a pre-defined connection to the database 110) of the operator's choice using the SDK (and APIs therein) of a desired BI software application 130. The blank universe is populated via its corresponding template that is provided by the BI automation tool 140. For example, the BI automation tool 140 includes one or more application macros, such as spreadsheet macros, that are executed to retrieve the universe details from a user-selected spreadsheet file, to retrieve a template that corresponds with the blank universe, and to populate the blank universe (with a pre-defined connection to the database 110) with the retrieved universe details based on the retrieved template, through use of APIs to the BusinessObjects™ application (as provided by its SDK). Accordingly, the application macro of the BI automation tool 140 calls on the BusinessObjects™ application to create a new universe by populating the blank universe with the universe details retrieved by the macros.

At 540, upon the operator's request or instruction, the BI automation tool 140 saves the newly populated universe for use to interface with the database 110. For example, the BI automation tool 140 retrieves the created universe from the BusinessObjects™ application and saves it in an electronic storage space, such as a CRM in the database 110 or anywhere else that is accessible by the BI automation tool 140.

Figure 6:
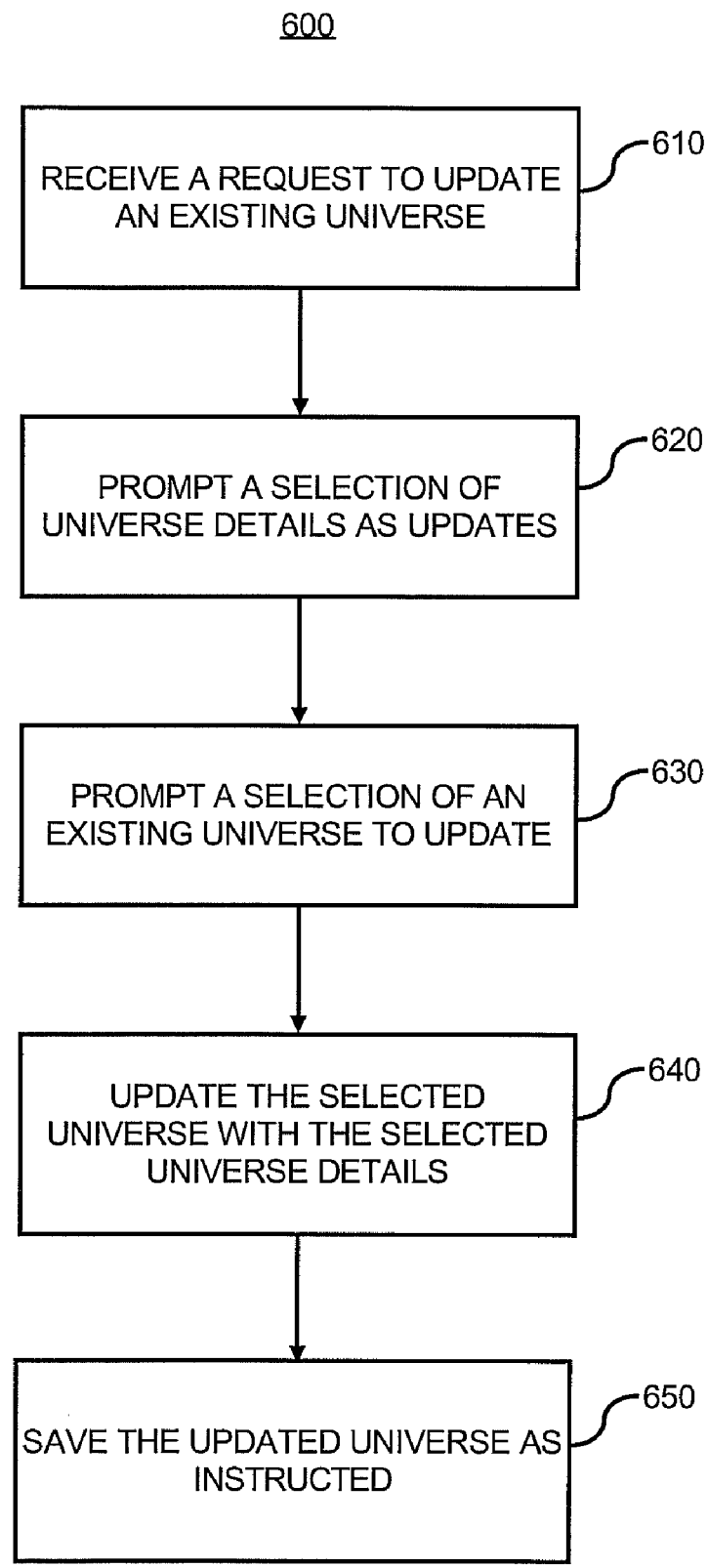
FIG. 6 illustrates a flowchart diagram of a method for the universe updating functionality as performed by a BI automation tool, in accordance with one embodiment.

FIG. 6 illustrates a flowchart diagram of a method 600 for the universe updating functionality (147, FIG. 1B) as performed by the BI automation tool 140.

At 610, when an operator clicks on the button 147 for a request to modify or update an existing universe, the BI automation tool 140 receives the request.

At 620, in response, the BI automation tool 140 prompts the operator to select the desired universe details to update an existing universe. The universe details may be stored in a file, such as a spreadsheet file. For example, the BI automation tool 140 prompts the operator to select a spreadsheet file that contains the desired universe details for updating the existing universe. The file may be one that was previously documented through reverse engineering an existing universe (as described above with reference to FIG. 4) and such a file may have been subsequently modified. Alternatively, the file may be one that was previously created and populated with all the desired universe details by the operator or others, such as a corresponding spreadsheet file that was used to initially create the existing universe (as described above with reference to FIG. 5) and subsequently modified. Thus, the operator may desire to modify or update the existing universe to reflect the modifications in the corresponding file of universe details. Accordingly, the BI automation tool 140 allows an operator to easily modify or update an existing universe by modifying or updating the corresponding file of universe details for the existing universe. The BI Automation tool 140 then automates the rest of the process by calling on the BI application to modify the existing universe with the modified universe details. This is in contrast to the conventional time-consuming process of requiring the operator to actually employs the BI application 130 to enter the modified universe details and generate a modified universe.

At 630, once the BI automation tool 140 receives the selected universe details, it further prompts the operator to select or identify an existing universe from a list of available universes, as described earlier with reference to FIG. 4, to update.

At 640, once the operator selects a universe to update, the BI automation tool 140 proceeds to update the selected universe with the selected universe details. Again, for example, the BI application 130 is the BusinessObjects™ business intelligence application, and the BI automation tool 140 is operable to call on the BusinessObjects™ application through APIs provided by the SDK of such a BusinessObjects™ application. In this example, the BI automation tool 140 includes one or more spreadsheet macros that are executed access the APIs of the BusinessObjects™ application to call on such a BI application to update the selected universe with the selected universe details.

At 650, upon the operator's request, the BI automation tool 140 saves the updated universe for use to interface with the database 110. It should be noted that the method 600 for updating an existing universe is similar to the method 500 for creating the universe, except for the fact that updating an existing universe is often faster than creating an entirely new one because the BI automation tool 140 does not need to create universe details in an existing universe that need not be updated from the selected universe details for updating.

Figure 7:
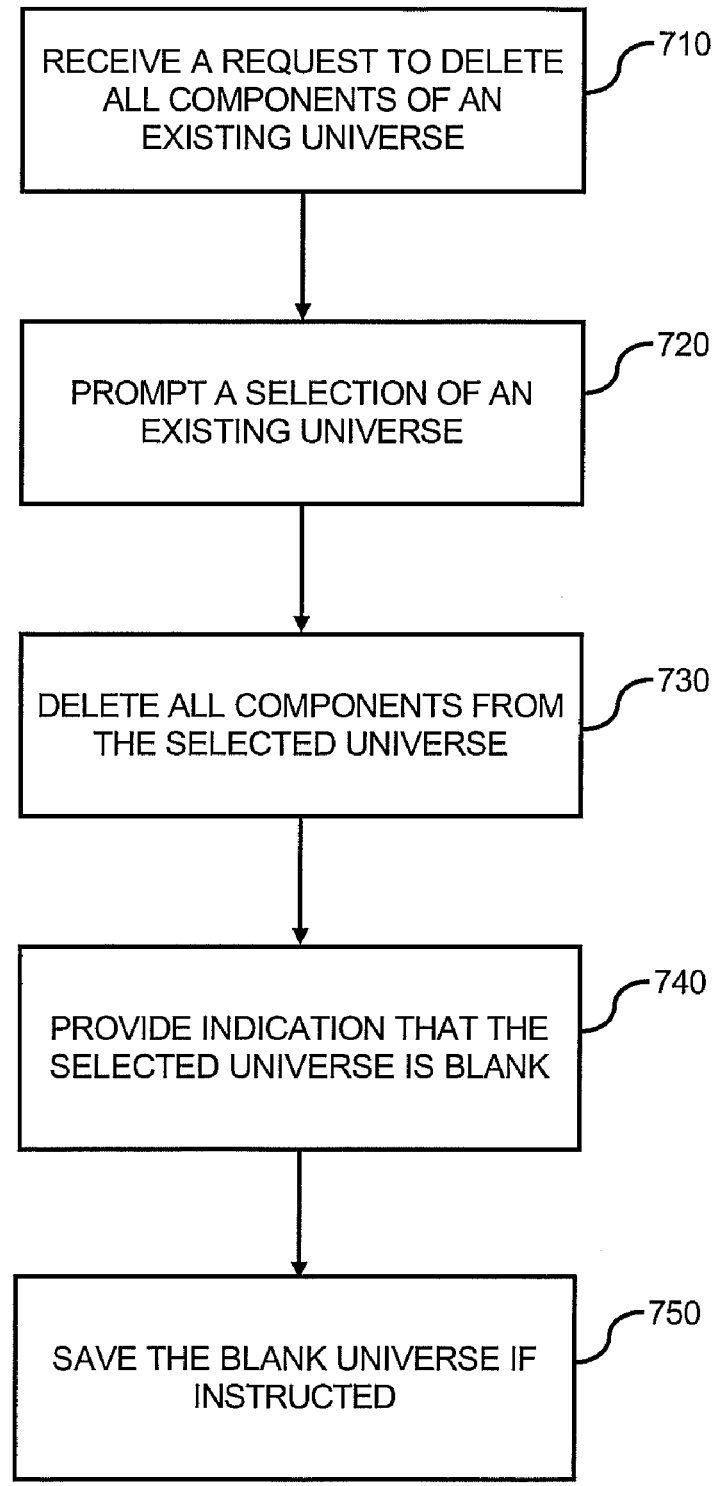
FIG. 7 illustrates a flowchart diagram of a method 700 for the delete-all-universe components functionality as performed by a BI automation tool, in accordance with one embodiment.

FIG. 7 illustrates a flowchart diagram of a method 700 for the delete-all-universe components functionality (149, FIG. 1B) as performed by the BI automation tool 140.

At 710, when an operator clicks on the button 149 for a request to delete all components or details of an existing universe, the BI automation tool 140 receives the request.

At 720, in response, the BI automation tool 140 prompts the operator to select or identify a universe from a list of available universes, as described earlier with reference to FIG. 4, from which to delete all components.

At 730, one the BI automation tool 140 receives the selected universe to delete all components therein, it proceeds as instructed to delete all the components, for example, classes, tables, joins, objects, conditions, contexts, and hierarchies components. Again, for example, the BI application 130 is the BusinessObjects™ application, and the BI automation tool 140 is operable to call on the BusinessObjects™ application through APIs provided by the SDK of such a BusinessObjects™ application. In this example, the BI automation tool 140 includes one or more spreadsheet macros that are executed to access the APIs of the BusinessObjects™ application to delete all components of the selected universe. Universe design is an iterative process. Thus, once a user employs the BI automation tool 140 to create a universe, the user may desire to re-create the universe with new or additional design specifications by deleting all components of a selected universe or begin anew with a blank universe.

At 740, once all the universe components have been deleted, the BI automation tool 140 provides a message indicating that the selected universe is now blank and optionally asks the operator whether he or she would like to save the blank universe.

At 750, upon receiving the operator's request or instruction to save the blank universe, the BI automation tool 140 saves the blank universe as a file in an electronic storage location or space, such as a CRM, for subsequent access as desired. This blank universe may be subsequently used in method 500 (FIG. 5) for create a new universe.

In summary, the various embodiments of the BI automation tool as described herein enable designers of database universes to create, update, and maintain database universes with ease through time-saving and cost-saving features, such as the use of spreadsheet macros in conjunction with software development kits available from commercially-available business intelligence software applications.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for providing access to an electronic database for business intelligence, comprising:

receiving a request to create a new universe to interface with the electronic database to access the electronic database for business intelligence, wherein the new universe maps terms used by a business intelligence application to the electronic database;

receiving an input of a first set of universe details to populate the new universe, wherein the universe details include classes for the terms used by the business intelligence application, and the classes describe groups of data in the electronic database, the universe details further including objects describing data elements or fields and their associated data tables in the electronic database that are associated with the classes, and joins between the data tables based on values;

executing at least a first application macro to populate the new universe with the received first set of universe details by calling the business intelligence application to create the new universe with the populated first set of universe details; and providing the created new universe as a metadata layer that interfaces with the electronic database to provide access to the electronic database, wherein the interfacing with the electronic database includes interfacing with the new universe using at least one of the classes, objects and joins in the new universe to execute a query in the electronic database associated with at least one of the terms used by the business intelligence application.

2. The method of claim 1, further comprising:
saving the created new universe.

3. The method of claim 2, further comprising:
receiving a request to modify an existing universe that is used to interface with the electronic database to access the electronic database for business intelligence;
receiving an input of a second set of universe details to populate the existing universe;
receiving an identification of the existing universe to modify; and
executing at least a second application macro to modify the identified existing universe with the received second set of universe details by calling the business intelligence application to modify the existing universe.

4. The method of claim 3, wherein the existing universe is the saved new universe, and the second set of universe details is the first set of universe details that has at least one or more of the universe details therein modified.

5. The method of claim 1, further comprising:
receiving a request to get a standard template for detailing a universe to interface with the electronic database;
creating the standard template with a predefined format;
saving the created standard template; and
using the saved standard template to compile a file of the first set of universe details in accordance with the predefined format.

6. The method of claim 5, wherein receiving an input of the first set of universe details comprises:
receiving as input the file of the first set of universe details as compiled using the saved standard template.

7. The method of claim 2, further comprising:
receiving a request to reverse engineer an existing universe that is used to interface with the electronic database to access the electronic database for business intelligence;
receiving an identification of the existing universe to reverse engineer;
executing at least a third application macro to retrieve universe details of the existing universe; and
saving the retrieved universe details to document the existing universe.

8. The method of claim 7, wherein the existing universe is the saved new universe, and the retrieved universe details is the first set of universe details.

9. The method of claim 8, further comprising:
receiving a second request to reverse engineer a second existing universe;
receiving an identification of the second existing universe to reverse engineer, wherein the second existing universe is a modification of the saved new universe;
executing at least the third application macro to retrieve universe details of the second existing universe;
comparing the retrieved universe details of the existing universe and the retrieved universe details of the second existing universe to determine a difference between the existing universe and the second existing universe due to the modification.

10. The method of claim 2, further comprising:
receiving a request to delete all universe details of an existing universe that is used to interface with the electronic database to access the electronic database for business intelligence;
receiving an identification of the existing universe to reverse engineer; and
executing at least a fourth application macro to delete all the universe details of the identified existing universe.

11. The method of claim 10, further comprising:
providing an indication that the existing universe is blank subsequent to the deletion of all the universe details in the existing universe.

12. The method of claim 11, further comprising:
providing an option to save the blank existing universe.

13. The method of claim 12, further comprising:
saving the blank existing universe upon receiving an input selection of the option.

14. The method of claim 10, wherein the existing universe is the saved new universe, and the all universe details is the first set of universe details.

15. The method of claim 1, wherein the first set of universe details includes low-level design specifications for the new universe.

16. A system for providing business intelligence of a business, comprising:
an electronic database that stores therein data about operations of the business;
a universe that interfaces with electronic database to provide access to the electronic database to obtain business intelligence of the business based on the data of business operations stored in the electronic database;
a business intelligence application that provides the business intelligence by accessing the data of business operations stored in the electronic database via the universe, the business intelligence application also provides the universe; and
a computer executing a business intelligence automation tool that automatically calls on the business intelligence application to access the universe, the business intelligence automation tool further comprises:
a) a first application macro executed to automatically provide a first set of universe details to the business intelligence application to create the universe;
b) a second application macro executed to automatically provide a second set of universe details to the business intelligence application to modify the universe once created; and c) a third application macro executed, in response to an input instruction to reverse engineer the universe, to automatically retrieve the universe details from the universe once created in order to document the universe, wherein the universe maps terms used by the business intelligence application to the electronic database, and the universe details include classes for the terms used by the business intelligence application, and the classes describe groups of data in the electronic database, the universe details further including objects describing data elements or fields and their associated data tables in the electronic database that are associated with the classes, and joins between the data tables based on values.

17. The system of claim 16, wherein the business intelligence automation tool further includes:

a fourth application macro executed to delete the universe details from the universe once created.

18. The system of claim 17, wherein at least one of the first, second, third, and fourth macro is a spreadsheet macro of an electronic spreadsheet.

19. The system of claim 16, wherein the business intelligence application provides a set of application programming interfaces (APIs) for the business automation tool to access with at least one of the first, second, and third application macro.

20. A computer-readable storage device on which is stored computer-executable programming code that comprises:

programming code executable by a computer to provide an option to create a new universe to interface with an electronic database to access the electronic database for business intelligence, an option to update an existing universe, an option to document universe details in the existing universe, and an option to delete all of the universe details in the existing universe;

programming code for a first application macro that is executable by a computer to automatically provide a first set of universe details to the business intelligence application to create the new universe;

programming code for a second application macro that is executable by a computer to automatically provide a second set of universe details to the business intelligence application to modify the existing universe; and programming code for a third application macro that is executable by a computer to automatically retrieve the universe details from the existing universe in order to document the universe, wherein the universe maps terms used by a business intelligence application to the electronic database, and the universe details include classes for the terms used by the business intelligence application, and the classes describe groups of data in the electronic database, the universe details further including objects describing data elements or fields and their associated data tables in the electronic database that are associated with the classes, and loins between the data tables based on values.

* * * * *